United States Patent [19]
Belart

[11] 3,858,945
[45] Jan. 7, 1975

[54] DEVICE FOR EFFECTING A VOLUME CHANGE IN A HYDRAULIC ANTISKID BRAKE SYSTEM

[75] Inventor: Juan Belart, Walldorf, Germany

[73] Assignee: ITT Industries, Inc., New York, N.Y.

[22] Filed: Jan. 18, 1973

[21] Appl. No.: 324,692

[30] Foreign Application Priority Data
Jan. 22, 1972 Germany............................ 2202996

[52] U.S. Cl......... 303/21 F, 188/181 A, 303/21 AF
[51] Int. Cl................................................ B60t 8/06
[58] Field of Search.......... 303/21 F, 21 AF, 61–63, 303/68–69; 188/181; 137/505.27

[56] References Cited
UNITED STATES PATENTS

| | | | |
|---|---|---|---|
| 3,597,012 | 8/1971 | Packer et al. | 303/21 F |
| 3,669,403 | 6/1972 | Slavin et al. | 303/21 F |
| 3,722,960 | 3/1973 | Menar | 303/21 F |
| 3,747,990 | 12/1971 | Tanguy | 303/21 F |

Primary Examiner—Trygve M. Blix
Assistant Examiner—D. C. Butler
Attorney, Agent, or Firm—John T. O'Halloran; Menotti J. Lombardi, Jr.; Alfred C. Hill

[57] ABSTRACT

This invention relates to a device for effecting a volume change in a hydraulic brake system equipped with an antiskid control system. The device includes a displacement piston assembly having several parts and offering pressure application surfaces for the control pressure in one direction and for the main pressure of the brake system in the other direction. The displacement piston assembly is arranged together with a separating valve within a blind bore of a one piece casing or housing. A radially elastic bushing is provided in the opening of the blind bore sealed between that portion of the displacement piston assembly extending out of the blind bore and the inner wall of the blind bore. The advantages of this device are (1) inexpensive construction, (2) no close tolerances are required and (3) it is not necessary to very accurately center the displacement piston assembly in the blind bore to ensure complete functional safety due to the radially elastic bushing. In case of failure of the control pressure, the displacement piston assembly is maintained in its neutral position by an emergency spring.

4 Claims, 1 Drawing Figure

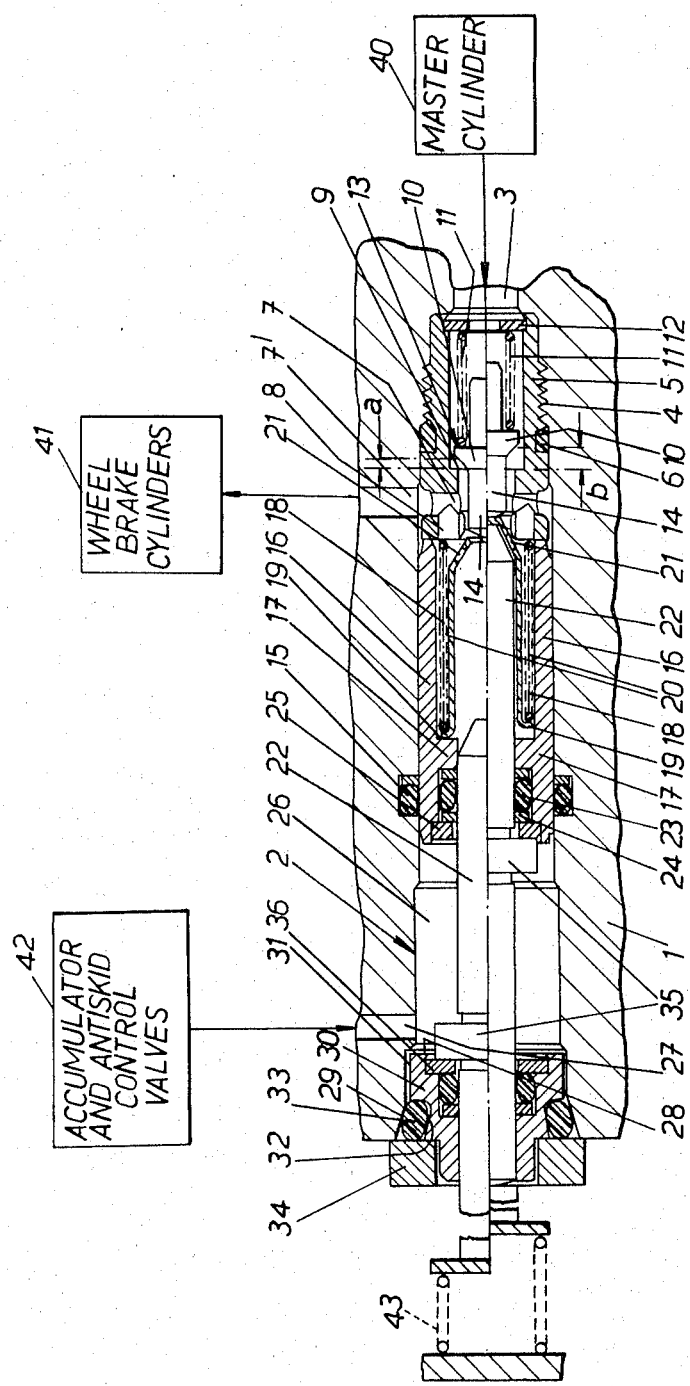

DEVICE FOR EFFECTING A VOLUME CHANGE IN A HYDRAULIC ANTISKID BRAKE SYSTEM

BACKGROUND OF THE INVENTION

The invention relates to a device for effecting a volume change in closed pressure systems, especially in a hydraulic brake line of a vehicle equipped with an antiskid control system, in which the device is pressure-controlled in accordance with measured antiskid wheel acceleration values and is maintained in its neutral position by means of a mechanical spring in case of failure of the control pressure.

A known method for achieving short-time changes of the pressure in a pressure system consists in the controlled movement of a piston in a cylinder connected to the pressure system, which naturally requires that first the connection to the pressure source or the vacuum source is interrupted.

This method is used especially in many designs of antiskid systems. In order to prevent the lock-up of the vehicle wheels and the resulting risks during a braking operation, the hydraulic connection between the brake actuation device and the wheel brake cylinder is interrupted by means of a separating valve operating as a function of an output control quantity which is frequently the deceleration of the wheel rotation, and the volume of the brake line section connected with the wheel cylinder is increased by the controlled movement of a displacement piston, thus, reducing the prevailing braking pressure. As soon as the risk of wheel lock-up has passed, the initial condition is restored by a return of the piston and the opening of the separating valve.

In the majority of the devices of this type the separating valve is mechanically coupled with the displacement piston in such a way that an extension of the displacement piston protruding through the valve opening normally maintains the valve shutter element off its seat and closes the separating valve during the controlled movement of the displacement piston. Such an arrangement is described, for instance, in the French Pat. No. 2,030,813. The displacement piston is maintained in its neutral position by an accumulator or control pressure applied to its load or pressure application surface remote from the separating valve, and, thus, the separating valve is maintained open. When the antiskid control system responds, the accumulator or control pressure is removed from the load surface of the displacement piston, and the displacement piston is shifted by the braking pressure applied to the ring or pressure application surface adjacent the separating valve, thus closing the spring-loaded separating valve so that the pressure in the wheel cylinder is reduced. In order to prevent a complete failure of the brake system in case of a failure of the accumulator or control pressure, a control piston is provided, which is pretensioned against a strong spring by means of the accumulator or control pressure, and the extension of the control piston protrudes into the chamber of the displacement piston, maintaining said displacement piston in neutral position by the force of the spring in case of a failure of the accumulator pressure, thus permitting a normal braking operation.

The manufacture and the assembly of such an arrangement are difficult and expensive since the cylinder bores of the pistons, as well as the pistons themselves and the bushing for the extension of the control piston into the displacement piston have to be manufactured within very close tolerances and correctly centered in order to assure the required functional safety of the system. Since the cylinder chamber of the entire casing or housing has several steps and narrows and/or passages on both sides, the casing has to be assembled from several casing sections provided with the required associated bores, and this method renders even more difficult the adjustment and centering of all components. In addition, this design presents the disadvantages that as a result of slightly incorrect manufacturing tolerances or slight losses of pressure medium during operation it may happen that the separating valve is not maintained completely open in case of operation of the emergency spring, which means that the normal braking operation is disturbed. This is of particular importance in an arrangement disclosed in copending application of H. von Grunberg, W. Fink and D. Kircher, Ser. No. 282,532, filed Aug. 21, 1972, now U.S. Pat. No. 3,788,710, in which arrangement several displacement piston units, as required in an antiskid controlled brake system, are combined into one compact assembly and are maintained in their neutral position by a single common emergency spring in case of failure of the control or accumulator pressure.

SUMMARY OF THE INVENTION

An object of this invention is to create a displacement piston unit not presenting the above disadvantages, which is simple and inexpensive with regard to manufacture and assembly, and which ensures a reliable operation of the entire system.

According to the present invention this is achieved by locating a multi-part displacement piston unit, provided with load surfaces for the control pressure in the one direction and for the main system pressure in the other direction, together with a separating valve coupled with it in a blind bore of a casing, wherein a bushing, which is elastic in radial direction, is provided in the opening of the blind bore for the protruding portion of the displacement piston unit, which bushing fits tightly on the protruding portion and on the inner wall of the bore.

A feature of the present invention is the provision of a device for effecting a volume change in a hydraulic antiskid brake system comprising: a one piece housing having a longitudinal axis; a blind bore having an opening at one end thereof disposed in the housing coaxial of the housing; a displacement piston assembly disposed in the bore subjected to control pressure which is dependent upon measured antiskid wheel acceleration values and braking pressure of the brake system, the piston assembly having several parts, a first of the parts extending through the opening at the one end of the bore and a second of the parts providing first pressure application surface for the control pressure to move the piston assembly in a first direction toward the other end of the housing and providing second pressure application surfaces for the brake pressure to move the piston assembly in a second direction opposite to the first direction; a separating valve having a valve body and a valve seat disposed within the bore adjacent the other end of the housing, the valve body being in a cooperating relationship with the piston assembly; a radially elastic bushing disposed in the opening of the one end of the bore, the bushing being sealed to the outer surface of the first of the parts of the piston assembly and the inner surface of the bore; and a mechanical spring disposed in a cooperating relationship with the first of the parts to maintain the piston assembly in its neutral position in case of failure of the control pressure.

According to another feature of the present invention the displacement piston assembly consists of a sleeve which actually effects the volume increase, the main pressure of the system being applied to one of its end ring surface, while the other end ring surface can be loaded with the control pressure which is introduced into a ring-shaped chamber formed in the blind bore. The displacement piston assembly consists further of a stem protruding into the sleeve and is sealed against the sleeve wall, and of a cap corresponding to the shape of the stem and supported in the sleeve, the cap resting against the valve body of the separating valve which is designed as a seat valve.

According to still another feature of this invention the cap, which is pre-tensioned by a pressure spring against a collar of the sleeve protruding radially inward therefrom, is pressure-balanced due to lateral openings contained in the cap.

According to a further feature of this invention the end of the stem projecting out of the bushing can be spring-loaded by an emergency spring in case of failure of the control pressure and can be moved off its valve seat by a lift height $b$, which corresponds to the height to which the cap can be lifted off the collar of the sleeve against the force of the pressure spring. Height $b$ exceeds the normal lift height $a$ of the valve body when the system is operating normally.

According to still a further feature of this invention the bushing includes a guide element having its inner surface sealed by a seal to the outer surface the portion of the displacement piston unit protruding from the blind bore and is inserted with a clearance into the opening of the blind bore. A radially elastic ring gasket seals the outer surface of the guide element to the inner surface of the blind bore.

BRIEF DESCRIPTION OF THE DRAWING

Above-mentioned and other features and objects of this invention will become more apparent by reference to the following description taken in conjunction with the accompanying drawing, in which the sole FIGURE illustrates a longitudinal cross section of the device in accordance with the principles of the present invention. The entire device is shown in split condition along the longitudinal axis, the upper half illustrates all parts in normal position, and the lower half illustrates the position of the same parts in case of failure of the accumulator or control pressure.

DESCRIPTION OF THE PREFERRED EMBODIMENT

The casing 1 is provided according to the FIGURE with a blind bore 2 running from left to right. The connection 3 for the pressure medium runs from the bottom of the blind bore 2 to the pressure source providing the main pressure, which in the case of a brake system is the brake master cylinder 40. At this end adjacent to connection 3 for the pressure medium, the blind hole 2 is provided with a short thread 4, and a sleeve 5 having a corresponding thread is screwed into thread 4 and is sealed against the wall of the blind bore 2 by means of a gasket 6 located in a circular groove. In the other part of sleeve 5 adjacent blind bore 2 a transverse bore 7 is provided, which is correlated to a bore 7' in casing 1 which leads into that portion of the pressure system whose volume is to be changed by the movement of the displacement piston of this invention, in the case of a brake system this will be the wheel brake cylinders 41 and the related supply lines. A longitudinal bore 8 leads from transverse bore 7 to the remaining space of blind bore 2. A step is provided on the inner wall of sleeve 5, which forms the valve seat 9 for the cone-shaped surface of the valve shutter body 10 of the separating valve. Valve shutter body 10 is pre-tensioned in the closing direction by a spring 11 which is supported on the one side on a ring disc 12 fixed in sleeve 5, and on the other side on a stop face 13 on the valve shutter body 10. When the separating valve is closed, the connection for the pressure medium line between connection 3 and bores 7 and 7' is interrupted. The cylindrical extension 14 of valve shutter body 10 protrudes through sleeve 5.

A further sleeve 16, which in neutral position is resting with one end ring surface against the adjacent end ring surface of sleeve 5, is movably arranged in blind bore 2 and is sealed against inner surface of bore 2 by means of a ring seal 15. Sleeve 16 is the component which is in reality effects the volume change. It is provided with a collar 17 extending radially inward in that third of sleeve 16 which is remote from separating valve 9 and 10. A pre-tensioned spring 18, which is supported at one end on the end ring surface of sleeve 5, holds the rim formed by a collar 19 bent radially outward of an oblong cap 20, whose inside diameter corresponds approximately to that of collar 17, against collar 17 of sleeve 16. The head end of cap 20 is of truncated-cone shape and in neutral position of the assembly the end surface of cap 20 is in contact with extension 14 of valve body 10 protruding through sleeve 5. Openings 21 are provided laterally in cap 20, preferably on the cone surface, thus assuring permanent pressure balance in cap 20. A stem 22, movably guided at collar 17, extends into sleeve 16, the head end of this stem being of the shape of a truncated cone and protruding only slightly beyond collar 17 in normal position of the assembly. Stem 22 is sealed to sleeve 16 by a sealing ring 23 inserted in the step formed by collar 17. Sealing ring 23 together with the support rings 24, which are preferably located at both sides, is secured by a support disc 25 fixed at the opening of sleeve 16. Behind sleeve 16 stem 22 is surrounded in blind bore 2 by a ring-shaped space 26 from which a pressure medium connection 27 leads through directional control valves to an accumulator pressure or control pressure source, or to a vacuum reservoir as indicated by block 42. At a certain distance from sleeve 16 blind bore 2 is provided with a small step 28 followed by a chamfer 29 extending to the opening of bore 2. A guide element 30, through which stem 22 extends tightly sealed, is inserted with a clearance 31 into step 28. Guide element 30 is provided in its outer surface with a beveled step 32. In the ring-shaped space between the two chambers of blind bore 2 and guide element 30 a radially elastic gasket 33 is inserted, which is maintained in place by a counter-mounted support disc 34. As a result of clearance 31 between the wall of blind bore 2 and guide element 30, and of the elasticity of gasket 33, an exact centering of stem 22 with guide element 30 in blind bore 2 is not required, since stem 22 is self-centering within a certain tolerance range during the assembly.

In addition, a collar 35 is formed on stem 22, which is supported on an end surface of guide element 30, or on a support disc 36 fixed to this guide element, thus preventing the stem from sliding out. The diameter of the portion of stem 22, which is located in neutral position in space 26, is slightly reduced in comparison with the portion guided in the guide element 20. In neutral position, stem 22 projects beyond blind bore 2 by a predetermined length corresponding to its working stroke, and on its free end it can be spring-loaded by an emergency return spring 43 which is pretensioned by accumulator pressure.

The method of operation of the device of this invention is described in the following.

In the normal position of the device space 26 is connected through pressure medium connection 27 to a pressure source, so that sleeve 16 is held in contact with sleeve 5 against the force of spring 18 and against the braking pressure that may be applied through pressure medium connection 3. As a result of the described difference in diameter stem 22 is held in contact with support disc 36. On the other hand, the pressure in space 26 holds cap 20 in neutral position through collar 17 of sleeve 16 against the force of spring 18, i.e. the end surface of cap 20 is held in contact with extension 14 of valve body 10, and valve body 10 is held off its valve seat 9 by the length of the lift $a$ against the force of spring 11. The opening for the pressure medium from connection 3 to connection 7' is free and, in the case of the brake system, a pressure can be built up in the wheel cylinders 41 from master cylinder 40. Cap 20 is pressure-balanced with regard to this pressure applied through connection 3 as a result of its opens 21, while an additional pressure is applied to stem 22 which is held through its collar 35 in contact with support disc 36 by means of this pressure. If the pressure in the portion of the system connected to connection 7', for instance, in wheel cylinders 41, is to be temporarily reduced, connection 27 of space 26 is separated by the actuation of the directional control valves from the pressure medium source and is connected with a vacuum reservoir, so that the pressure is reduced in space 26. Thus, sleeve 16 is shifted by the pressure applied to it through connection 3. As a result of the force of pretensioned spring 18, which overcomes the friction of gaskets 15 and 23, cap 20 follows the movement of sleeve 16 and, thus, releases valve 10, to which the braking pressure is also applied, thus seating its cone surface on valve seat 9 and, thus, block the pressure medium opening for the braking pressure. Sleeve 16 can then move on only by a distance corresponding to the pressure prevailing in the portion connected to connection 7', which results in a volume expansion and, thus, in a pressure reduction in this portion. The movement of piston 16 can be stopped and reversed by renewed actuation of the above directional control valves, thus, restoring the original condition.

If the accumulator or control pressure fails, the pretensioned emergency return spring 43 is no longer held down, but applies a load to stem 22 projecting out of guide element 30, shifting said stem to an extent (see lower half of the FIGURE) that the face of its truncated cone-shaped head end comes into contact with the corresponding interior surface of cap 20, lifting the cap together with the valve body by a longer lift $b$, during which movement its collar 35 strikes against the ring shaped surface of sleeve 16 and/or support disc 25, thus, maintaining sleeve 16 in its neutral position. Although a volume expansion is no longer possible in this condition, the pressure system itself remains capable of functioning since the pressure medium flow from connection 3 to connection 7' is assured. In an assembly comprising several devices for volume change provided with one common emergency return spring, a design according to the present invention is particularly advantageous in that different tolerances which may occur in the various units may be covered in case of emergency by the larger stroke $b$ of the valve body. According to this invention, exact centering at the guide element 30 of stem 26 is not required. The individual components of the device may be mounted one by one in the blind bore of the casing which is formed in one piece. It is no longer necessary to assemble the casing from several pieces, each provided with cylinder bores with narrow flow openings, which have to be adjusted and centered during the assembly. This results in a considerable reduction of the manufacturing costs while increasing the functional safety.

While I have described above the principles of my invention in connection with specific apparatus it is to be clearly understood that this description is made only by way of example and not as a limitation to the scope of my invention as set forth in the objects thereof and in the accompanying claims.

I claim:

1. A device for effecting a volume change in a hydraulic antiskid brake system comprising:

a one piece housing having a longitudinal axis;

a blind bore having an opening at one end thereof disposed in said housing coaxial of said housing;

a displacement piston assembly disposed in said bore subjected to control pressure which is dependent upon measured antiskid wheel acceleration values and braking pressure of said brake system, said piston assembly having several parts, a first of said parts extending through said opening at said one end of said bore and a second of said parts providing first pressure application surfaces for said control pressure to move said piston assembly in a first direction toward the other end of said housing and providing second pressure application surfaces for said brake pressure to move said piston assembly in a second direction opposite to said first direction;

a separating valve having a valve body and a valve seat disposed within said bore adjacent said other end of said housing, said valve body being in a cooperating relationship with said piston assembly;

a radially elastic bushing disposed in said opening of said one end of said bore, said bushing being sealed to the outer surface of said first of said parts of said piston assembly and the inner surface of said bore; and a mechanical spring disposed in a cooperating relationship with said first of said parts to maintain said piston assembly in its neutral position in case of failure of said control pressure;

said second part including a sleeve disposed in a slidably sealed relation with the inner surface of said bore, one end of said sleeve providing said first pressure application surface and the other end of said sleeve providing said second pressure application surfaces, said sleeve providing desired volume expansion;

said first part including
a stem extending through said opening of said one end of said bore into said sleeve, said stem being slidably sealed to the inner surface of said sleeve; and another of said several parts including
a cap supported in said sleeve having a shape corresponding to the shape of said stem, an end of said cap adjacent said other end of said housing being in contact with said valve body; and further including a ring shaped space formed between the inner surface of said bore and the outer surface of said stem adjacent said one end of said sleeve to receive said control pressure.

2. A device according to claim 1, further including
a collar extending radially inward from said sleeve; and
a pressure spring to pre-tension said cap against said collar; and wherein
said cap includes lateral openings to enable said cap to be pressure balanced.

3. A device according to claim 2, wherein
said mechanical spring is an emergency spring in a cooperative relationship with an end of said stem extending out of said bushing, said emergency spring operating on said stem to lift said cap against the force of said pressure spring off said collar and thereby lift said valve body off its valve seat a given amount exceeding the normal amount when said control pressure is in operation.

4. A device according to claim 3, wherein
said bushing includes
a guide element tightly embracing said stem adjacent the end thereof extending from said bore and inserted in said bore with clearance,
a seal disposed between the inner surface of said guide element and the outer surface of said stem, and
a radially elastic gasket disposed between the outer surface of said guide element and the inner surface of said bore.

* * * * *